US007657364B2

(12) United States Patent
Guo et al.

(10) Patent No.: US 7,657,364 B2
(45) Date of Patent: Feb. 2, 2010

(54) APPARATUS, SYSTEM, AND METHOD FOR THERMAL MANAGEMENT OF AN ENGINE COMPRISING A CONTINUOUSLY VARIABLE TRANSMISSION

(75) Inventors: Linsong Guo, Columbus, IN (US); Timothy R. Frazier, Columbus, IN (US)

(73) Assignee: Cummins IP. Inc, Minneapolis, MN (US)

( * ) Notice: Subject to any disclaimer, the term of this patent is extended or adjusted under 35 U.S.C. 154(b) by 281 days.

(21) Appl. No.: 11/870,287

(22) Filed: Oct. 10, 2007

(65) Prior Publication Data

US 2009/0099758 A1 Apr. 16, 2009

(51) Int. Cl.
*G06F 19/00* (2006.01)
*F01N 3/20* (2006.01)

(52) U.S. Cl. ....................... 701/110; 701/103; 701/115; 60/274; 60/285; 60/295

(58) Field of Classification Search .................. 701/51, 701/53, 54, 101–105, 110, 111, 114, 115; 123/299, 300, 305; 60/274, 277, 285, 286, 60/287, 295, 297, 299–303, 311
See application file for complete search history.

(56) References Cited

U.S. PATENT DOCUMENTS 6,382,177 B1 * 5/2002 Saito .......................... 123/299
6,606,979 B2 * 8/2003 Kimura ...................... 123/500
6,829,890 B2 * 12/2004 Gui et al. ...................... 60/295
6,952,918 B2 * 10/2005 Imai et al. ..................... 60/295
6,978,604 B2 * 12/2005 Wang et al. ................... 60/297
7,086,220 B2 * 8/2006 Imai et al. ...................... 60/274
7,178,331 B2 * 2/2007 Blakeman et al. ............. 60/301
7,421,837 B2 * 9/2008 Abe ............................ 60/295
7,469,533 B2 12/2008 Dawson et al.
2004/0055282 A1 3/2004 Gray et al.
2005/0154519 A1 * 7/2005 Kim ............................ 701/51
2005/0223699 A1 * 10/2005 Ancimer et al. ............... 60/286
2006/0242950 A1 11/2006 Wang et al.
2008/0078169 A1 4/2008 Ishibashi
2009/0099758 A1 4/2009 Guo

FOREIGN PATENT DOCUMENTS

JP 2004285908 A * 10/2004

OTHER PUBLICATIONS

PCT/US2009/031015 International Search Report and Written Opinion, Aug. 13, 2009.

* cited by examiner

*Primary Examiner*—Willis R Wolfe, Jr.
(74) *Attorney, Agent, or Firm*—Kunzler & McKenzie

(57) ABSTRACT

A method is disclosed for thermal management of an engine comprising a continuously variable transmission. The method includes an engine capability module storing a torque-speed map comprising a first region where the engine inefficiently regenerates an aftertreatment device, a second region where the engine efficiently regenerates the aftertreatment device, and a third region where the engine is not capable of regenerating the aftertreatment device. The method further includes an aftertreatment determination module determining a regeneration index, an operating conditions module determining an engine speed and an engine load, and a speed-load adjustment module adjusting a speed-load target. The method further includes the speed-load adjustment module adjusting the speed-load target to a preferred region along equal power curves of the torque-speed map based on the regeneration index.

34 Claims, 6 Drawing Sheets

APPARATUS, SYSTEM, AND METHOD FOR THERMAL MANAGEMENT OF AN ENGINE COMPRISING A CONTINUOUSLY VARIABLE TRANSMISSION

BACKGROUND OF THE INVENTION

1. Field of the Invention

This invention relates to a thermal management of a combustion engine and more particularly relates to supporting the efficient regeneration of an aftertreatment device such that an optimal fuel efficiency is achieved.

2. Description of the Related Art

Consumer demand for the benefits provided by the internal combustion engine, environmental concerns, and falling reserves of fossil fuel continue to spur improvements in the durability, fuel efficiency, and the emission's quality of the combustion engine. Competing performance demands, such as increasing fuel efficiency while reducing harmful emissions, provide ongoing engine development challenges. Many techniques of reducing emissions are well known in the art and substantially all of them adversely affect fuel efficiency. For example, a common catalytic converter must periodically achieve certain temperature thresholds, as a maintenance step, to oxidize particulates within the device (i.e. regenerate). In an alternate example, a diesel particulate filter collects soot that must be continually, or periodically, burned off by temperature increases in the exhaust stream passing through the device.

The preceding aftertreatment device examples illustrate the need of most aftertreatment devices for requisite heat that typically must be provided via the exhaust stream passing through the aftertreatment system. One common method to increase the temperature of the exhaust stream consists of adding extra fuel in-cylinder and/or down stream of an exhaust manifold during a portion of the combustion cycle (i.e. fuel dosing). Depending on the timing and the location where additional fuel is introduced efficiency may be reduced by a phase disturbance of the combustion cycle, unburned fuel lingering in the exhaust stream, and/or by decreasing the air to fuel ratio.

Another common approach to raise the temperature in the exhaust stream includes restricting the amount of air available for combustion, once again effectively reducing the air to fuel ratio. One example of how this may be accomplished includes creating a restriction in the exhaust stream, such as by choking the exhaust flow through a variable geometry turbocharger. Once again, however, this method generates a back-pressure on the engine, which reduces the work efficiency of the engine. Temperature increases may need to be either periodic and/or fall within specific ranges to limit the amount of nitrous oxides that may be generated in the high heat environment. Many present applications of the internal combustion engine face thermal control challenges that may impede the optimization of fuel efficiency, degrade the power output, generate thermal stress on aftertreatment components, and reduce the overall effectiveness of the aftertreatment system.

SUMMARY OF THE INVENTION

From the foregoing discussion, it should be apparent that a need exists for an apparatus, system, and method that provide efficient thermal management of an engine. Beneficially, such an apparatus, system, and method would promote a fuel efficient regeneration of an aftertreatment device by adjusting an operation cycle of the engine according to preferred thermal regions and fuel efficient pathways through an engine torque-speed map.

The present invention has been developed in response to the present state of the art, and in particular, in response to the problems and needs in the art that have not yet been fully solved by currently available methods. Accordingly, the present invention has been developed to provide an apparatus, system, and method for thermal management of an engine that overcome many or all of the above-discussed shortcomings in the art.

An apparatus is disclosed for the thermal management of an engine. The apparatus an engine capability module configured to store an engine speed-load map corresponding to an engine. The speed-load map may have a first region wherein the engine does not efficiently regenerate the aftertreatment device. The speed-load map may include an aftertreatment determination module configured to determine a regeneration index for an aftertreatment device. The apparatus may further have an operating conditions module configured to determine an engine speed and an engine load, and a speed-load adjustment module configured to adjust a speed-load target out of the first region based on the regeneration index. The torque-speed map may further include a second region wherein the engine may efficiently regenerate the aftertreatment device. Adjusting the speed-load target out of the first region may include adjusting the speed-load target out of the first region and into the second region based on the regeneration index.

A method is disclosed for thermal management of an engine. The method includes the engine capability module storing the torque-speed map, and the aftertreatment determination module determining the regeneration index. The method further includes the operating conditions module determining the engine speed and the engine load, and the speed-load adjustment module adjusting the speed-load target. The method may further include storing the torque-speed map with a third region wherein the engine is not capable of regeneration the aftertreatment device. The method may proceed by adjusting the speed-load target out of the third region and into the second region.

A computer program product is disclosed that stores the torque-speed map, determines the regeneration index, determines the engine speed and the engine load, and adjusts the speed-load target. The computer program product may store the torque-speed map with the first region and with a third region wherein the engine is not capable of regenerating an aftertreatment device. Adjusting the speed-load target may include adjusting the speed-load target out of the third region and into the first region based on the regeneration index. In one embodiment the computer program product may adjust the speed-load target along an equal power curve of the torque-speed map, including adjusting the speed-load target to a point on an optimal speed-load line of the torque-speed map.

A system is disclosed for thermal management of an engine. The system may include the engine coupled to a continuously variable transmission (CVT) and the apparatus for thermal management of the engine. The system may further include the torque-speed map having the first region wherein the engine does not efficiently regenerate the aftertreatment device. In alternate embodiments the engine operating in the first region may regenerate the aftertreatment device by changing at least one base behavior of the engine, which may include implementing various thermal management strategies and/or fueling schemes.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
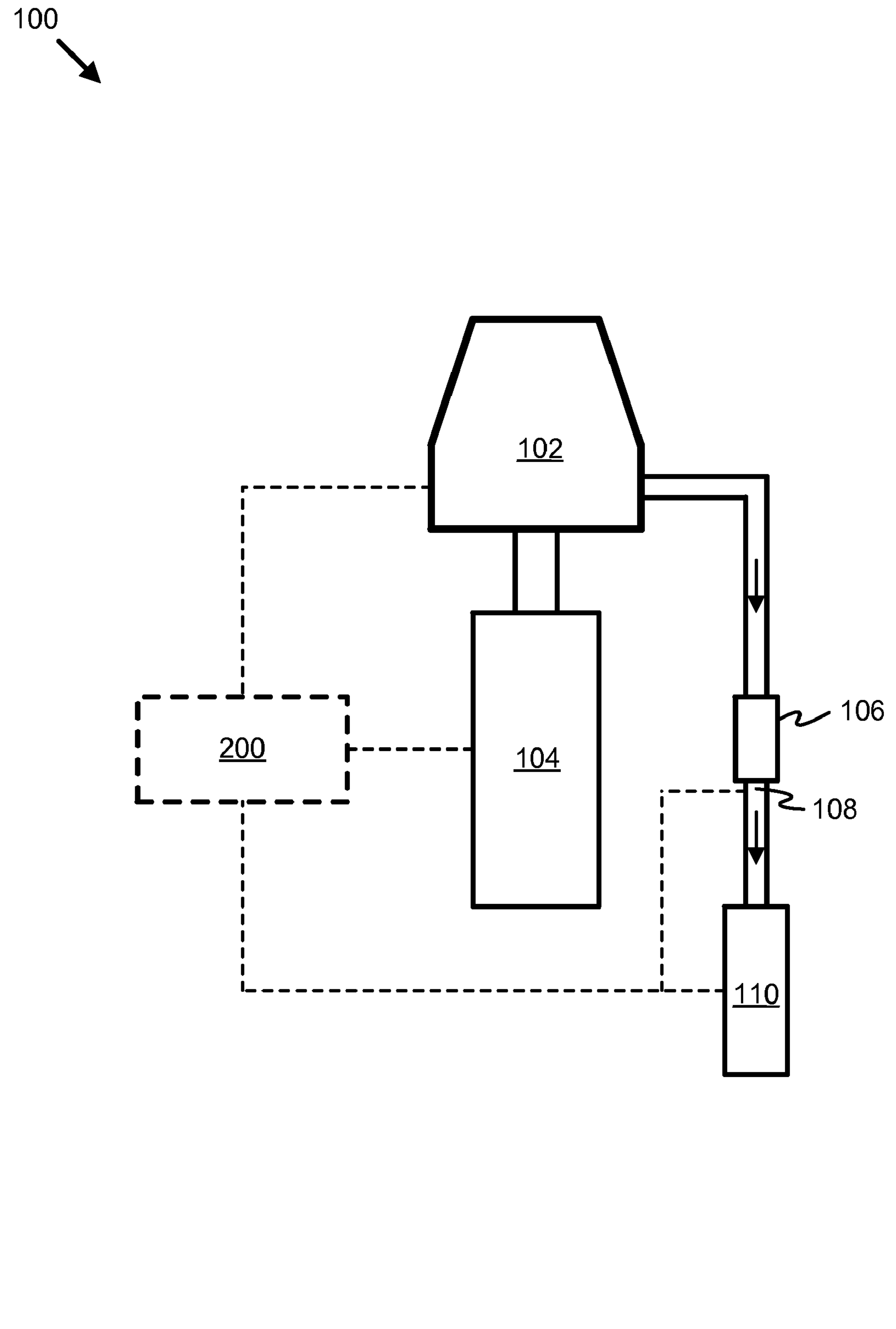
FIG. 1 is a schematic illustration depicting one embodiment of a system for thermal management of an engine in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic illustration depicting one embodiment of a system 100 for thermal management of an engine 102 in accordance with the present invention. The system 100 may comprise the engine 102 coupled to a continuously variable transmission (CVT) 104. The CVT 104 is capable of providing a continuous ratio in a range of vehicle operations such that the engine 102 may be running in predefined regions and/or through points on a torque-speed map. The system 100 may further include a turbocharger 106 comprising a turbocharger outlet 108 that directs exhaust flow to an aftertreatment device 110. In one embodiment the turbocharger 106 may comprise a variable geometry turbocharger (VGT) 106 comprising a variable restriction that may generate a back pressure on the engine 102. In one example the VGT may adjust the flow of air in the system 100 lowering the air to fuel ratio such that a temperature at the turbocharger outlet 108 may be increased. The aftertreatment device 110 may comprise a catalytic converter 110, a diesel particulate filter 110, and/or any other type of aftertreatment device 110 that may require continual or periodic increases in the exhaust flow temperature to facilitate regeneration.

The system 100 further comprises an apparatus 200 for thermal management of the engine 102. In one example, the apparatus 200 may comprise a controller 200, such as an engine control module (ECM) 200, which may be in communication with various components of the system 100. The apparatus 200 may interpret signals from sensors and/or datalinks throughout the system 100 that may indicate various operating conditions of the engine 102 and regeneration requirements of the aftertreatment device 110. In one embodiment the controller 200 comprises an engine capability module, an aftertreatment determination module, an operating conditions module, and a speed-load adjustment module.

Figure 2:
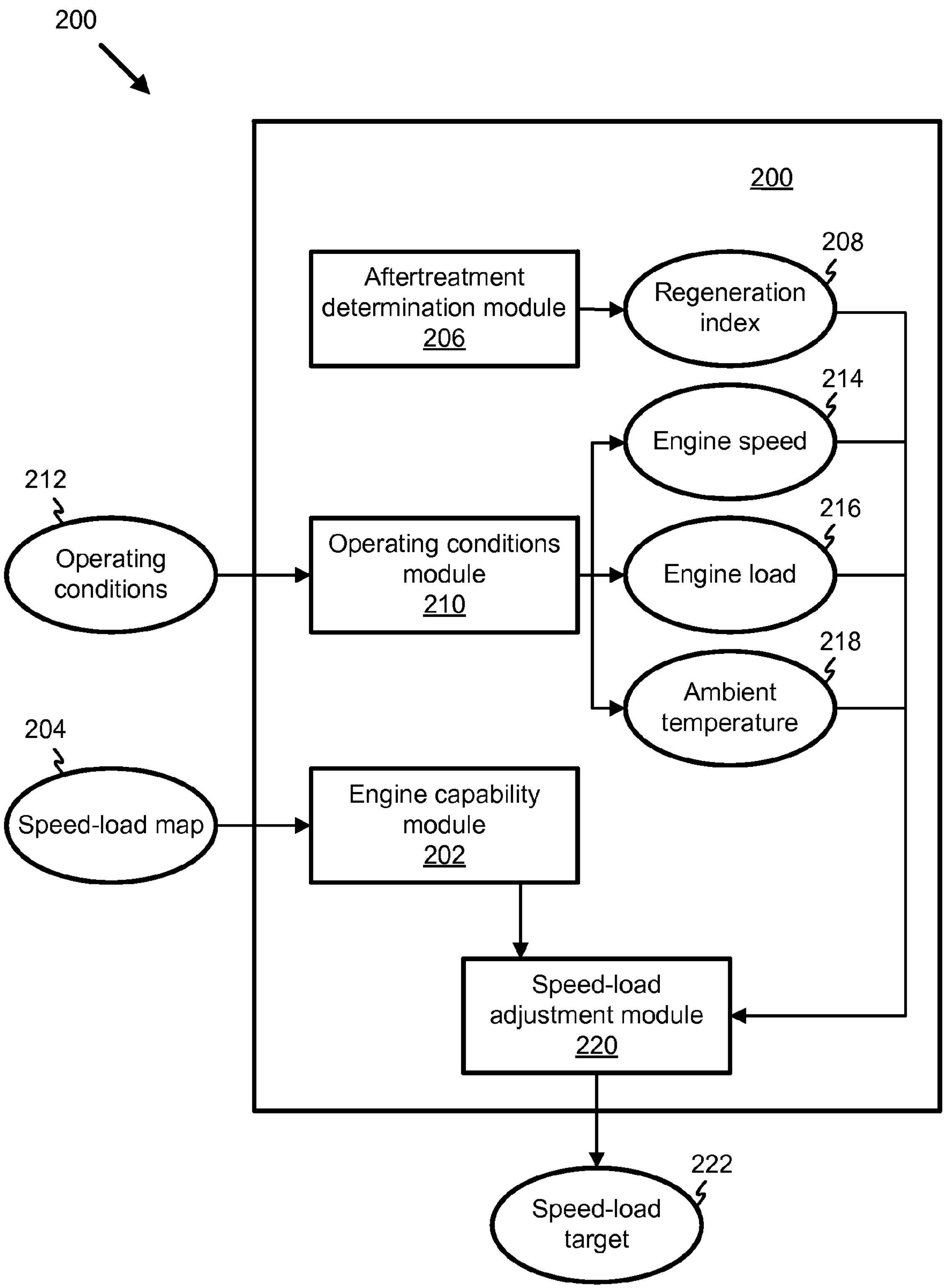
FIG. 2 is a schematic block diagram illustrating one embodiment of an apparatus for thermal management of an engine in accordance with the present invention.

FIG. 2 is a schematic block diagram illustrating one embodiment of an apparatus 200 for thermal management of an engine 102 in accordance with the present invention. The apparatus 200 may comprise the engine capability module 202 configured to store a torque-speed map 204 corresponding to the engine 102. In another embodiment the engine capability module 202 may be configured to store a plurality of torque-speed maps 204, each torque-speed map 204 corresponding to a specific operating mode such as a hot mode, cold mode, city mode, highway mode, and/or any other type of mode beneficial for distinguishing a set of operating conditions thereby permitting the optimization of the engine 102 according to the selected mode. Furthermore, distinguishing the mode according to which the engine 102 may be optimized may comprise interpolating between torque-speed maps and/or applying off-sets to an applicable torque-speed map.

The apparatus 200 may further comprise the aftertreatment determination module 206 configured to determine a regeneration index 208 for the aftertreatment device 110. The regeneration index 208 may comprise an indication that the aftertreatment device 110 requires a regeneration event. For example, the regeneration index 208 may comprise a value that may be incrementally increased until the value exceeds a certain threshold indicating that the aftertreatment device 110 requires regeneration. The regeneration index 208 may reset to a predetermined value after the regeneration is achieved. The specific parameters comprising the regeneration index 208 may be determined by one of skill in the art for the particular application. Common parameters for determining the regeneration index 208 may include time, temperature, pressures, mass flow, and/or any other operating condition that may be determined that may indicate that the aftertreatment device 110 may require regeneration.

The apparatus 200 further comprises the operating conditions module 210 configured to interpret a set of operating conditions 212 to determine an engine speed 214 and an engine load 216. In one embodiment the operating conditions module 210 may determine an ambient temperature 218. The apparatus 200 may further comprise the speed-load adjustment module 220 configured to adjust a speed-load target 222 based on the regeneration index 208. In one embodiment the speed-load adjustment module 220 may further reference the current engine speed 214, engine load 216, ambient temperature 218, and torque-speed map 204 to determine preferred adjustments along a power curve of the torque-speed map 204 where the engine 102 may regenerate an aftertreatment device and optimize fuel efficiency. In one embodiment a specific torque-speed map 204 may be referenced for each of a range of ambient temperatures 218. Furthermore, the speed-load adjustment module 220 may interpolate between torque-speed maps 204, and/or implement offsets of the torque-speed map 204. One of skill in the art may determine the most beneficial configuration of torque-speed maps 204, interpolations, and off-sets for a given set of operation conditions 212 and a given application of the present invention.

Figure 3:
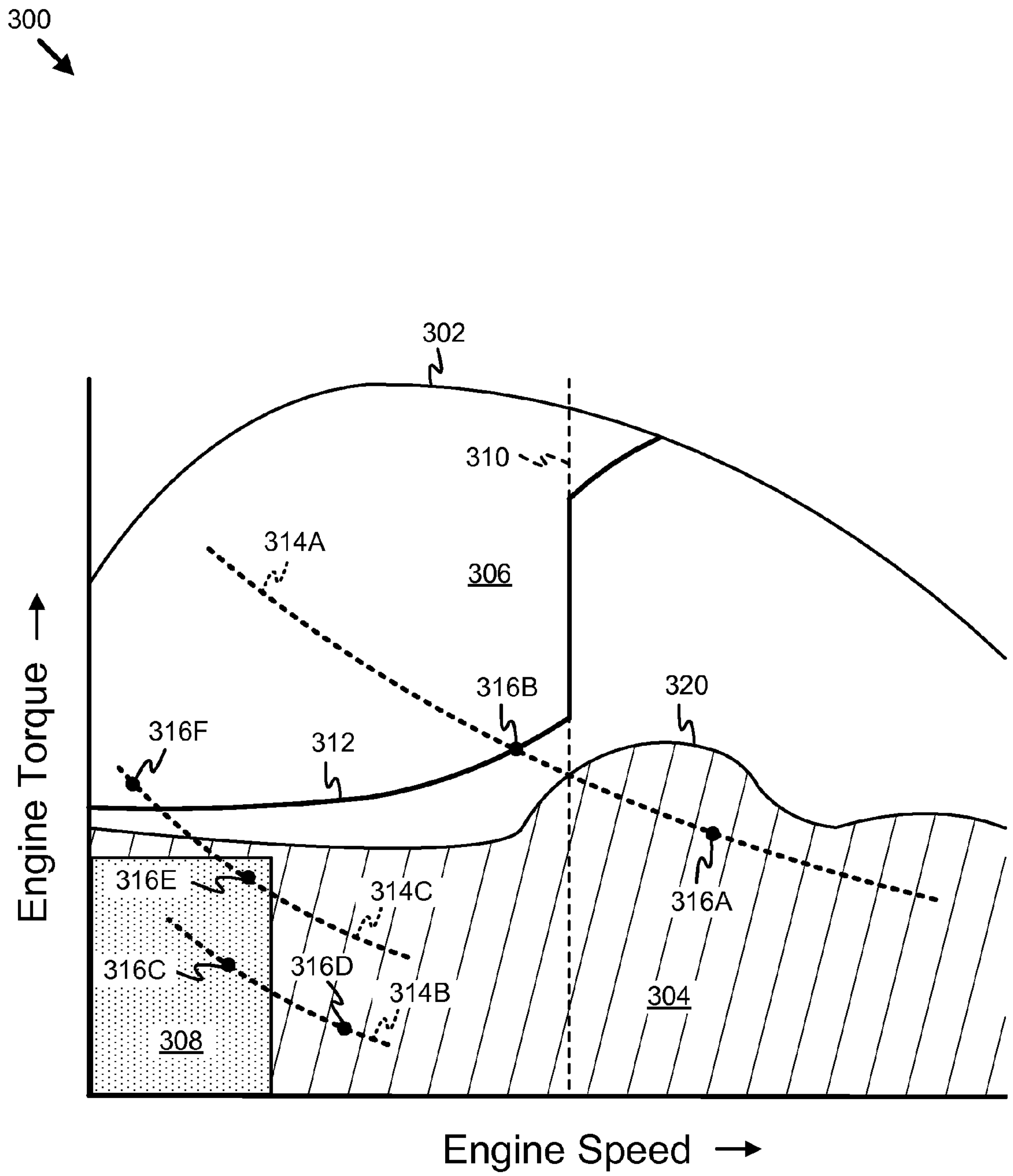
FIG. 3 is a graph illustrating one embodiment of a torque-speed map in accordance with the present invention.

FIG. 3 is a graph illustrating one embodiment of a torque-speed map 300 in accordance with the present invention. The torque-speed map 300 comprises a maximum speed-load boundary 302 that may define the work space for the engine 102. In the existing art, thermal management is required to regenerate the aftertreatment device 110 in the region under a contour boundary 320. With a CVT, the engine 102 may be running along a predetermined operating curve regardless of a vehicle speed change, which may lead to a significant improvement in fuel economy, and also dramatically narrow the operating area of the engine 102 where thermal management is required for aftertreatment regeneration purposes over vehicle drive cycles. For example, the present invention may permit the engine 102 to be capable of operating at a constant speed of 3200 rpm, which may comprise an optimized fuel efficiency for the engine 102 at this engine speed, while further permitting aftertreatment regeneration without necessitating adjustment from 3200 rpm.

The torque-speed map 300 may have a first region 304 wherein the engine 102 does not efficiently regenerate the aftertreatment device 110. In one example of the engine 102 operating in the first region 304 of the torque-speed map 300 the engine 102 may not be capable of performing regeneration of the aftertreatment device 110. In another example of the engine 102 operating in the first region 304 of the torque-speed map 300 the engine 102 may regenerate the aftertreatment device 110 using various thermal management operating strategies. For example, adjusting a base behavior of the engine 102 may comprise adjusting a number of fuel injections, a fuel quantity, a fuel timing, a time interval between two fuel injections, an air-fuel ratio, an engine pumping work loss, a VGT, an intake air throttle, an exhaust air throttle, and/or other thermal management operating strategies and fueling schemes known in the art.

The torque-speed map 300 may further have a second region 306 wherein the engine 102 efficiently regenerates the aftertreatment device 110. The torque-speed map 300 may have a third region 308 wherein the engine 102 is not capable of regenerating the aftertreatment device 110. Each region 304, 306, 308 may be determined by one of skills in the art based on the range of turbocharger outlet temperatures observed for various areas of the torque-speed map 300. For example, the first region 304 may correspond to temperature ranges where the engine 102 may be able to only inefficiently regenerate the aftertreatment device 110, the second region 306 may correspond to temperature ranges where the engine 102 may efficiently regenerate the aftertreatment device 110, and the third region 308 may correspond to temperature ranges where the engine 102 may not be capable of regenerating the aftertreatment device 110.

The torque-speed map 300 may further show a fixed speed line 310. The fixed speed line 310 may comprise a beneficial cruising highway speed for the engine 102. For example, the fixed speed line 310 may indicate the engine's optimal rpm at 60 miles per hour that provides optimal fuel efficiency. The torque-speed map 300 may further comprise an optimal operation curve 312. The optimal operation curve 312 may comprise the most efficient smooth path through the torque-speed map 300 such that optimal fuel efficiency may be achieved. The optimal operation curve 312 may comprise an optimal fuel efficient trajectory 312 through the torque-speed map 300 and may be based on a specific engine fuel map under normal engine operating conditions and thermal management operating conditions, as well as the fuel consumed for the aftertreatment regeneration (in-cylinder dosing, or dosing downstream of the exhaust manifold, etc.), and/or any other aspect known in the art that may affect the optimal fuel efficient trajectory 312. One of skill in the art may determine the optimal operation curve 312 for the torque-speed map 300 of a specific engine 102 and application. A portion of the optimal operation curve 312 may coincide with the fixed speed line 310.

The torque-speed map 300 further depicts equal power curves 314. The equal power curves 314 indicate paths through the torque-speed map 300 where the horsepower is constant. For example, equal power curve 314A may show a constant 125 horsepower path through the first region 304 and the second region 306 of the torque-speed map 300. An engine 102 coupled to a CVT 104 may achieve smooth operation and transition through an equal power curve 314 because of the capability of CVT 104.

The torque-speed map 300 may show speed-load targets 316. In one example the apparatus 200 may be configured to adjust the speed-load target 316A out of the first region 304 based on the regeneration index 208. Furthermore, adjusting the speed-load target 316A out of the first region 304 may comprise adjusting the speed-load target 316A into the second region 306. In one embodiment adjusting the speed-load target 316A out of the first region 304 comprises adjusting the speed-load target 316A along the equal power curve 314A. For example, the speed-load target 316A may adjust to the speed-load target 316B. In one embodiment of the present invention adjusting the speed-load target 316A along the equal power curve 314A to the speed-load target 316B comprises adjusting to a point 316B on the optimal speed-load line 312.

The torque-speed map 300 further depicts the equal power curve 314B that may comprise a speed-load target 316C in the third region 308 and a speed load target 316D in the first region 304. In one embodiment the speed-load target 316C in the third region 308, where the engine 102 is not capable of regenerating the aftertreatment device 110, may be adjusted to the speed-load target 316D in the first region 304, where the engine 102 may be capable of regenerating the aftertreatment device 110. The adjustment from the third region 308 to the first region 304 may occur along the equal power curve 314B. The adjustment from the third region 308, where the engine 102 is not capable of performing regeneration, to the first region 304, may comprise an optimal fuel efficient transition where, in one embodiment, the aftertreatment device 110 operating in the first region 304 comprises the engine 102 changing at least one base behavior. For example, the engine may adjust a number of fuel injections, a fuel quantity, a fuel timing, a time interval between two fuel injections, an air-fuel ratio, an engine pumping work loss, a VGT, an intake air throttle, an exhaust air throttle, and/or other thermal management operating strategies known in the art.

The torque-speed map 300 further depicts the equal power curve 314C that may comprise a speed-load target 316E in the third region 308 and a speed-load target 316F in the second region 306. In one embodiment of adjusting the speed-load target 316E out of the third region 308, where the engine is not capable of performing regeneration, the optimal fuel efficient transition may be along the equal power curve 314C to the speed-load target 316F in the second region 306 where the engine is capable of generating the necessary temperature at the exhaust outlet 108 to regenerate the aftertreatment device 110.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
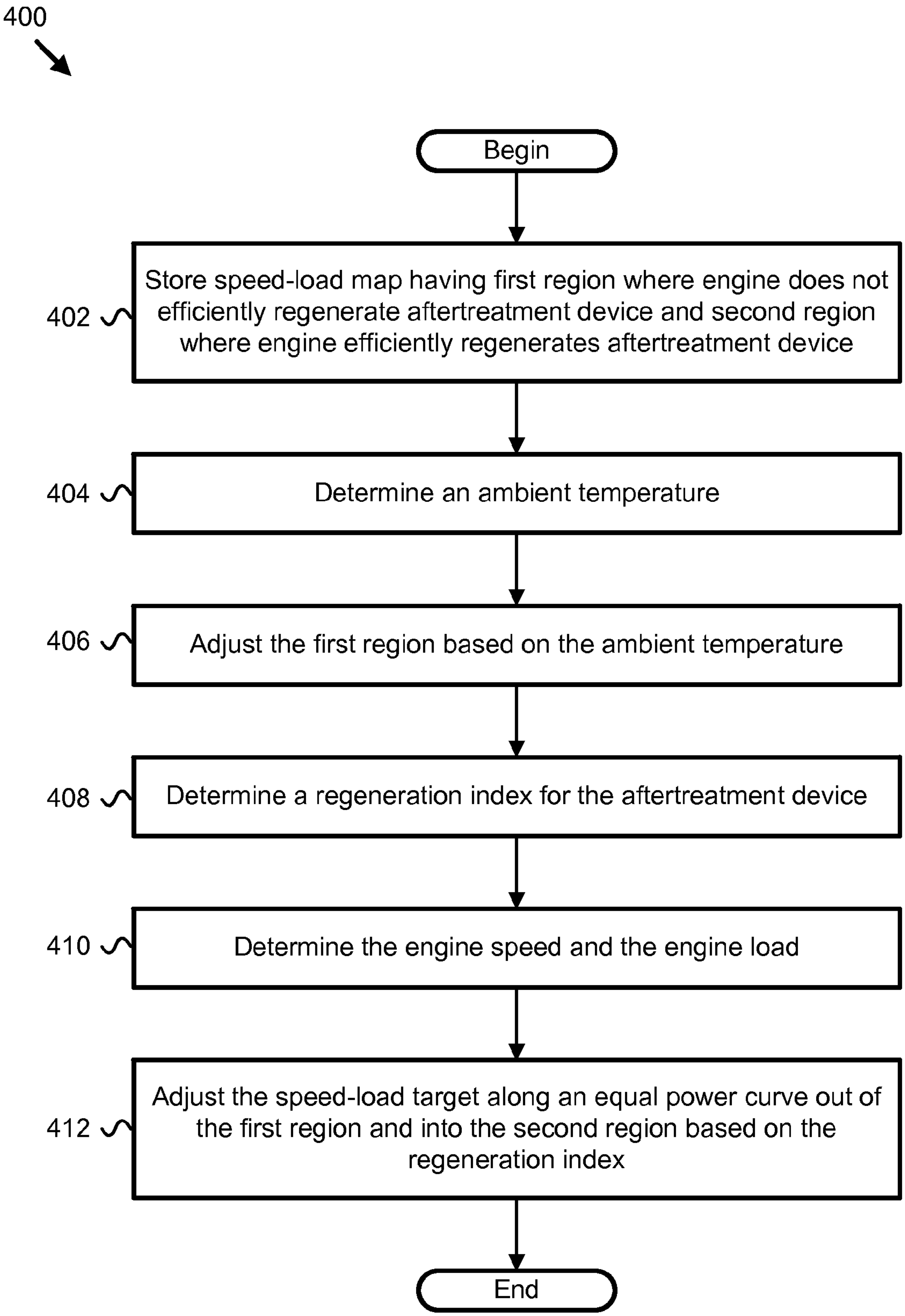
FIG. 4 is a schematic flow chart diagram illustrating one embodiment of a method for thermal management of an engine in accordance with the present invention.

FIG. 4 is a schematic flow chart diagram illustrating one embodiment of a method 400 for thermal management of an engine in accordance with the present invention. The method 400 begins with the engine capability module storing 402 the torque-speed map having the first region wherein the engine does not efficiently regenerate the aftertreatment device and the second region wherein the engine efficiently regenerates the aftertreatment device. In one embodiment the method 400 may continue by the operating conditions module determining 404 an ambient temperature and adjusting 406 the first region based on the ambient temperature. Other regions of the torque-speed map may be adjusted based on the ambient temperature. The method 400 further comprises the aftertreatment determination module determining 408 the regeneration index for the aftertreatment device.

The method 400 continues by the operating conditions module determining 410 the engine speed and the engine load. In one embodiment the method 400 concludes by the speed-load adjustment module adjusting 412 the speed-load target along an equal power curve of the torque-speed map out of the first region and into the second region based on the regeneration index. In a contemplated embodiment of the present invention the speed-load target adjustment may comprise maintaining the speed-load target in a preferred region of the torque-speed map. For example, the speed-load target may never enter the third region and/or the first region. In this example, reference to the speed-load targets entering the third region and/or the second region of the torque-speed map may indicate predictive aspects of where an engine may operate if proactive adjustments to the speed-load target are not made.

Figure 5:
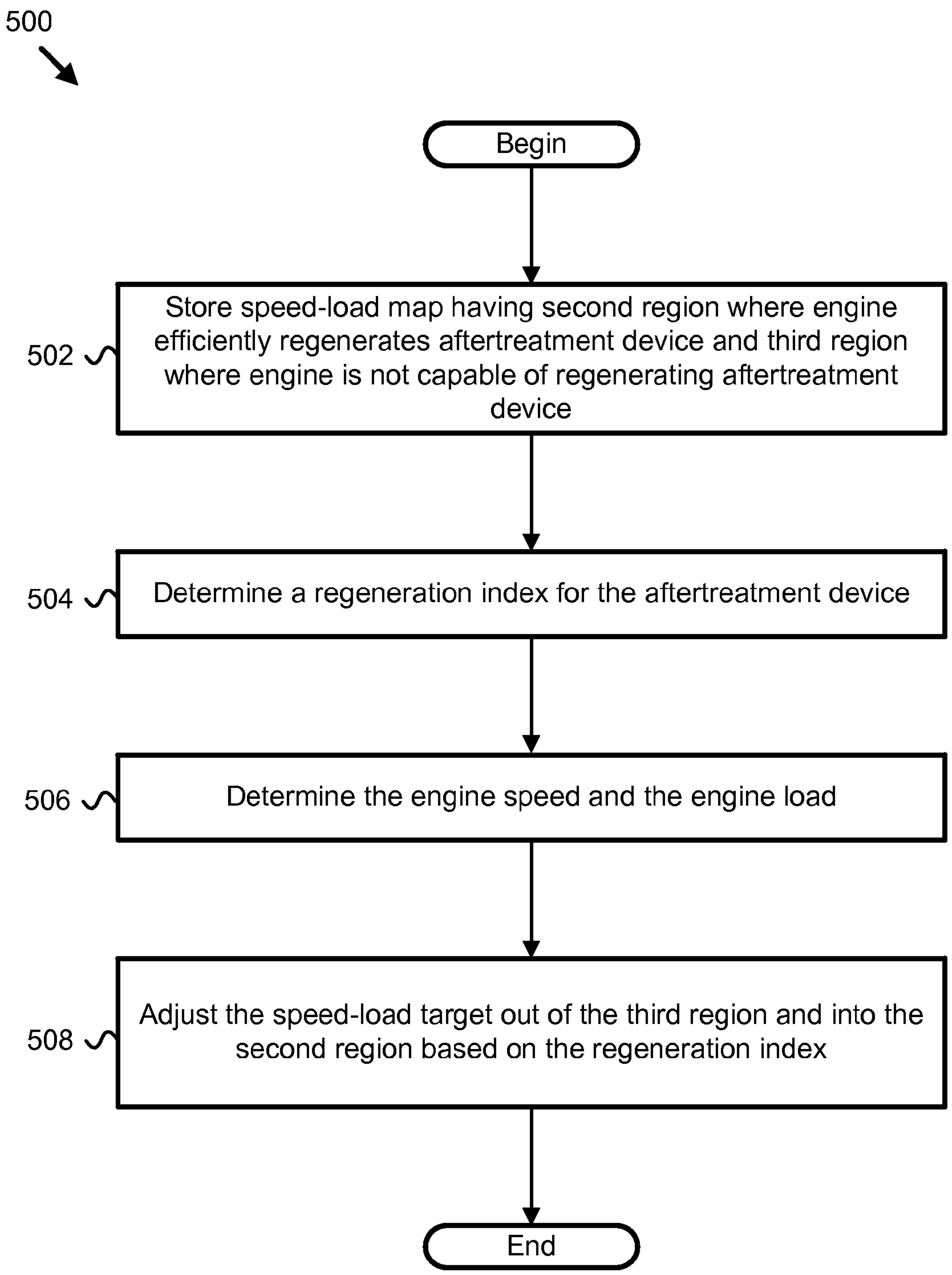
FIG. 5 is a schematic flow chart diagram illustrating an alternate embodiment of a method for thermal management of an engine in accordance with the present invention.

FIG. 5 is a schematic flow chart diagram illustrating an alternate embodiment of a method 500 for thermal management of an engine in accordance with the present invention. The method 500 begins by the engine capability module storing 502 the torque-speed map having the second region wherein the engine efficiently regenerates the aftertreatment device, and having the third region wherein the engine is not capable of regenerating the aftertreatment device. The method 500 continues by the aftertreatment determination module determining 504 the regeneration index for the aftertreatment device, and the operating conditions module determining 506 the engine speed and the engine load. In one embodiment the method 500 concludes by adjusting 508 the speed-load target out of the third region and into the second region based on the regeneration index.

Figure 6:
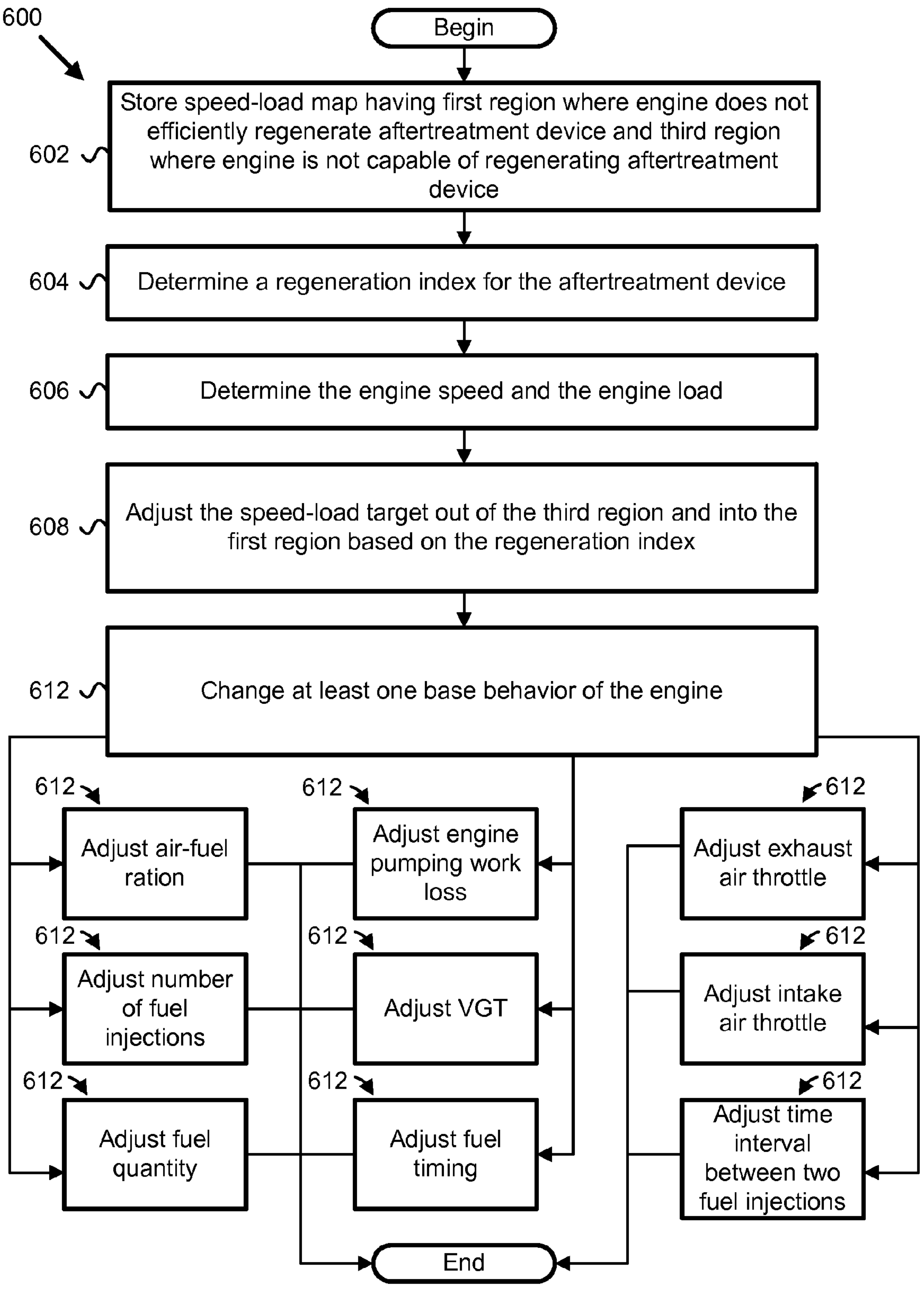
FIG. 6 is a schematic flow chart diagram illustrating a further embodiment of a method for thermal management of an engine in accordance with the present invention.

FIG. 6 is a schematic flow chart diagram illustrating a further embodiment of a method 600 for thermal management of an engine in accordance with the present invention. The method 600 begins by the engine capability module storing 602 the torque-speed map having the first region wherein the engine does not efficiently regenerate the aftertreatment device, and having the third region wherein the engine is not capable of regenerating the aftertreatment device. The method 600 continues by the aftertreatment determination module determining 604 the regeneration index for the aftertreatment device, and the operating conditions module determining 606 the engine speed and the engine load.

The method 600 further continues by the speed-load adjustment module adjusting 608 the speed-load target out of the third region and into the first region based on the regeneration index. In one embodiment the method 600 concludes by changing 612 at least one base behavior of the engine. For example, changing 612 at least one base behavior may comprise adjusting 612 a number of fuel injections, a fuel quantity, a fuel timing, a time interval between two fuel injections, an air-fuel ratio, an engine pumping work loss, a VGT, an intake air throttle, an exhaust air throttle, and/or other thermal management operating strategies known in the art.

The engine may operate differently during a normal operating mode than during a thermal management mode. Normally, the engine operating in the thermal management mode consumes more fuel than it does operating in the normal operating mode. Furthermore, in order to regenerate the aftertreatment device, additional fuel may be required to assist in elevating aftertreatment device inlet air temperature. Based on an energy balance, the heat required for aftertreatment regeneration may be calculated for each thermal management operating condition, as is known in the art. Also, the heat may be converted to a fuel quantity required for each operating condition. An overall fuel efficiency contour may be generated in a torque-speed map as is also known in the art. An optimal speed-load line (for example, refer to element 312 in FIG. 3) may be determined based on the overall fuel efficiency contour such that the overall fuel economy may be optimized.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for thermal management of an engine comprising a continuously variable transmission, the apparatus comprising:

an engine capability module configured to store a torque-speed map corresponding to an engine, the torque-speed map having a first region wherein the engine does not efficiently regenerate an aftertreatment device;

an aftertreatment determination module configured to determine a regeneration index for an aftertreatment device;

an operating conditions module configured to determine an engine speed and an engine load; and a speed-load adjustment module configured to adjust a speed-load target out of the first region based on the regeneration index.

2. The apparatus of claim 1, wherein storing the torque-speed map having a first region further comprises storing the torque-speed map having a second region wherein the engine efficiently regenerates the aftertreatment device, and wherein adjusting the speed-load target out of the first region comprises adjusting the speed-load target out of the first region and into the second region based on the regeneration index.

3. The apparatus of claim 1, wherein storing the torque-speed map further comprises storing the torque-speed map having a second region wherein the engine efficiently regenerates the aftertreatment device, and wherein storing the torque-speed map further comprises the torque-speed map having a third region wherein the engine is not capable of regenerating an aftertreatment device, and wherein adjusting the speed-load target comprises adjusting the speed-load target out of the third region and into the second region based on the regeneration index.

4. The apparatus of claim 1, wherein storing the torque-speed map further comprises storing the torque-speed map having a third region wherein the engine is not capable of regenerating an aftertreatment device, and wherein adjusting the speed-load target comprises adjusting the speed-load target out of the third region and into the first region based on the regeneration index.

5. The apparatus of claim 1, wherein the torque-speed map having a first region wherein the engine does not efficiently regenerate the aftertreatment device further comprises the engine regenerating the aftertreatment device by changing at least one base behavior of the engine selected from the list of base behaviors consisting of adjusting a number of fuel injections, adjusting a fuel quantity, adjusting a fuel timing, adjusting a time interval between two fuel injections, adjusting an air-fuel ratio, adjusting an engine pumping work loss, adjusting a variable geometry turbocharger, adjusting an intake air throttle, and adjusting an exhaust air throttle.

6. The apparatus of claim 1, wherein the operating conditions module is further configured to determine an ambient temperature, and the engine capability module is further configured to adjust the first region based on the ambient temperature.

7. The apparatus of claim 1, wherein adjusting the speed-load target comprises adjusting along an equal power curve.

8. The apparatus of claim 7, wherein adjusting the speed-load target along the equal power curve comprises adjusting to a point on an optimal speed-load line.

9. A method for thermal management of an engine comprising a continuously variable transmission, the method comprising:

storing a torque-speed map corresponding to an engine, the torque-speed map having a first region wherein the engine does not efficiently regenerate an aftertreatment device;

determining a regeneration index for the aftertreatment device;

determining an engine speed and an engine load; and adjusting a speed-load target out of the first region based on the regeneration index.

10. The method of claim 9, wherein storing the torque-speed map having a first region further comprises storing the torque-speed map having a second region wherein the engine efficiently regenerates the aftertreatment device, and wherein adjusting the speed-load target out of the first region comprises adjusting the speed-load target out of the first region and into the second region based on the regeneration index.

11. The method of claim 9, wherein storing the torque-speed map further comprises storing the torque-speed map having a second region wherein the engine efficiently regenerates the aftertreatment device, and wherein storing the torque-speed map further comprises the torque-speed map having a third region wherein the engine is not capable of regenerating an aftertreatment device, and wherein adjusting the speed-load target comprises adjusting the speed-load target out of the third region and into the second region based on the regeneration index.

12. The method of claim 9, wherein storing the torque-speed map further comprises storing the torque-speed map having a third region wherein the engine is not capable of regenerating an aftertreatment device, and wherein adjusting the speed-load target comprises adjusting the speed-load target out of the third region and into the first region based on the regeneration index.

13. The method of claim 9, wherein the torque-speed map having a first region wherein the engine does not efficiently regenerate the aftertreatment device further comprises the engine regenerating the aftertreatment device by adjusting at least one of a number of fuel injections, a fuel quantity, a fuel timing, and a time interval between two fuel injections.

14. The method of claim 9, wherein the torque-speed map having a first region wherein the engine does not efficiently regenerate the aftertreatment device further comprises the engine regenerating the aftertreatment device by changing an air-fuel ratio.

15. The method of claim 9, wherein the torque-speed map having a first region wherein the engine does not efficiently regenerate the aftertreatment device further comprises the engine regenerating the aftertreatment device by changing an engine pumping work loss.

16. The method of claim 9, wherein the torque-speed map having a first region wherein the engine does not efficiently regenerate the aftertreatment device further comprises the engine regenerating the aftertreatment device by adjusting an exhaust flow.

17. The method of claim 9, further comprising determining an ambient temperature, and adjusting the first region based on the ambient temperature.

18. The method of claim 9, wherein adjusting the speed-load target comprises adjusting along an equal power curve.

19. The method of claim 18, wherein adjusting the speed-load target along the equal power curve comprises adjusting to a point on an optimal speed-load line.

20. A computer program product comprising a computer readable medium having a computer readable program, wherein the computer readable program when executed on a computer causes the computer to:

- store a torque-speed map corresponding to an engine, the torque-speed map having a first region wherein the engine does not efficiently regenerate an aftertreatment device;
- determine a regeneration index for an aftertreatment device;
- determine an engine speed and an engine load; and
- adjust a speed-load target out of the first region based on the regeneration index.

21. The computer program product of claim 20, wherein storing the torque-speed map having a first region further comprises storing the torque-speed map having a second region wherein the engine efficiently regenerates the aftertreatment device, and wherein adjusting the speed-load target out of the first region comprises adjusting the speed-load target out of the first region and into the second region based on the regeneration index.

22. The computer program product of claim 20, wherein storing the torque-speed map further comprises storing the torque-speed map having a second region wherein the engine efficiently regenerates the aftertreatment device, and wherein storing the torque-speed map further comprises the torque-speed map having a third region wherein the engine is not capable of regenerating an aftertreatment device, and wherein adjusting the speed-load target comprises adjusting the speed-load target out of the third region and into the second region based on the regeneration index.

23. The computer program product of claim 20, wherein storing the torque-speed map further comprises storing the torque-speed map having a third region wherein the engine is not capable of regenerating an aftertreatment device, and wherein adjusting the speed-load target comprises adjusting the speed-load target out of the third region and into the first region based on the regeneration index.

24. The computer program product of claim 20, wherein the torque-speed map having a first region wherein the engine does not efficiently regenerate the aftertreatment device further comprises the engine regenerating the aftertreatment device by changing at least one base behavior selected from the list of base behaviors consisting of changing a fuel timing, changing an air-fuel ratio, changing a turbine pressure drop, and changing an exhaust throttle pressure drop.

25. The computer program product of claim 20, further comprising determining an ambient temperature, and adjusting the first region based on the ambient temperature.

26. The computer program product of claim 20, wherein adjusting the speed-load target comprises adjusting along an equal power curve.

27. The computer program product of claim 26, wherein adjusting the speed-load target along the equal power curve comprises adjusting to a point on an optimal speed-load line.

28. A system for thermal management of an engine comprising a continuously variable transmission, the system comprising:

- an engine coupled to a continuously variable transmission (CVT);
- an apparatus for thermal management of the engine, the apparatus comprising:
  - an engine capability module configured to store a torque-speed map corresponding to the engine, the torque-speed map having a first region wherein the engine does not efficiently regenerate an aftertreatment device;
  - an aftertreatment determination module configured to determine a regeneration index for an aftertreatment device;
  - an operating conditions module configured to determine an engine speed and an engine load; and
  - a speed-load adjustment module configured to adjust a speed-load target out of the first region based on the regeneration index.

29. The system of claim 28, wherein storing the torque-speed map having a first region further comprises storing the torque-speed map having a second region wherein the engine efficiently regenerates the aftertreatment device, and wherein adjusting the speed-load target out of the first region comprises adjusting the speed-load target out of the first region and into the second region.

30. The system of claim 28, wherein storing the torque-speed map further comprises storing the torque-speed map having a second region wherein the engine efficiently regenerates the aftertreatment device, and wherein storing the torque-speed map further comprises the torque-speed map having a third region wherein the engine is not capable of regenerating an aftertreatment device, and wherein adjusting the speed-load target comprises adjusting the speed-load target out of the third region and into the second region.

31. The system of claim 28, wherein storing the torque-speed map further comprises storing the torque-speed map having a third region wherein the engine is not capable of regenerating an aftertreatment device, and wherein adjusting the speed-load target comprises adjusting the speed-load target out of the third region and into the first region.

32. The system of claim 28, wherein the torque-speed map having a first region wherein the engine does not efficiently regenerate the aftertreatment device further comprises the engine regenerating the aftertreatment device by changing at least one base behavior of the engine selected from the list of base behaviors consisting of adjusting a number of fuel injections, adjusting a fuel quantity, adjusting an engine timing, adjusting a time interval between two fuel injections, adjusting an air-fuel ratio, adjusting an engine pumping work loss, adjusting a variable geometry turbocharger, adjusting an intake air throttle, and adjusting an exhaust air throttle.

33. The system of claim 28, wherein adjusting the speed-load target comprises adjusting along an equal power curve.

34. The system of claim 33, wherein adjusting the speed-load target along the equal power curve comprises adjusting to a point on an optimal speed-load line.

* * * * *